United States Patent

[11] 3,616,197

[72] Inventors Stephen W. Amberg
James, N.Y.;
Ralph G. Amberg, Monticello, Ind.; Frank S. Landers, Huntington, N.Y.
[21] Appl. No. 880,486
[22] Filed Dec. 10, 1969
[45] Patented Oct. 26, 1971
[73] Assignee Owens-Illinois
Toledo, Ohio

[54] PLASTIC LINED RECEPTACLE OR THE LIKE
13 Claims, 8 Drawing Figs.

[52] U.S. Cl. .................................................. 161/229,
156/160, 156/163, 156/212, 156/224, 156/229,
156/277, 156/285, 156/306, 156/321, 156/322,
156/331, 161/250, 161/270, 161/413, 229/3.1,
229/3.5, 229/30
[51] Int. Cl. ................................................. B32b 27/10,
B65d 5/56
[50] Field of Search ........................................... 156/160,
163, 212, 224, 229, 277, 322, 331, 285-287, 306;
161/227, 229, 247, 250, 270, 413; 117/15, 26 P;
229/3.1, 3.5, 30

[56] References Cited
UNITED STATES PATENTS

| | | | |
|---|---|---|---|
| 2,150,910 | 3/1939 | Chaplin | 229/3.5 X |
| 2,311,156 | 2/1943 | Casto | 161/413 X |
| 2,590,221 | 3/1952 | Stevens | 156/306 X |
| 2,653,880 | 9/1953 | Hendricks et al. | 117/68.5 |
| 2,909,443 | 10/1959 | Wolinski | 229/3.5 UX |
| 3,255,843 | 6/1966 | MacDonald | 156/285 X |
| 3,318,748 | 5/1967 | Hurst | 156/224 |
| 3,325,329 | 6/1967 | Bolesky | 156/285 X |

FOREIGN PATENTS

| 555,219 | 4/1958 | Canada | |

OTHER REFERENCES

" Thermoplastic Versamid Polyamide Resins," General Mills, 1963, p. 8 (copy in group 160)

Primary Examiner—John T. Goolkasian
Assistant Examiner—Joseph C. Cil
Attorney—Brooks, Heidt & Haffner ABSTRACT: Molded pulp plate having continuous unseamed liner of polypropylene film bonded to its interior surfaces by pigmented polyamide ink, or a pigmented resin emulsion, which serves as adhesive and also provides all or part of a decorative design visible through the transparent film. Underside of polypropylene film may have further decorative printing of conventional ink, the adhesive being printed or coated thereover. Method includes clamping a sheet of polypropylene film, having the dried resin adhesive on its underside surface, against the smooth rim of the plate; heating the plate and film to a temperature which is above the softening point temperature of the resin constituent of the pigmented coating but below the softening point temperature of polypropylene; and drawing a vacuum through the bottom of the plate to press the film against the interior surfaces of the plate.

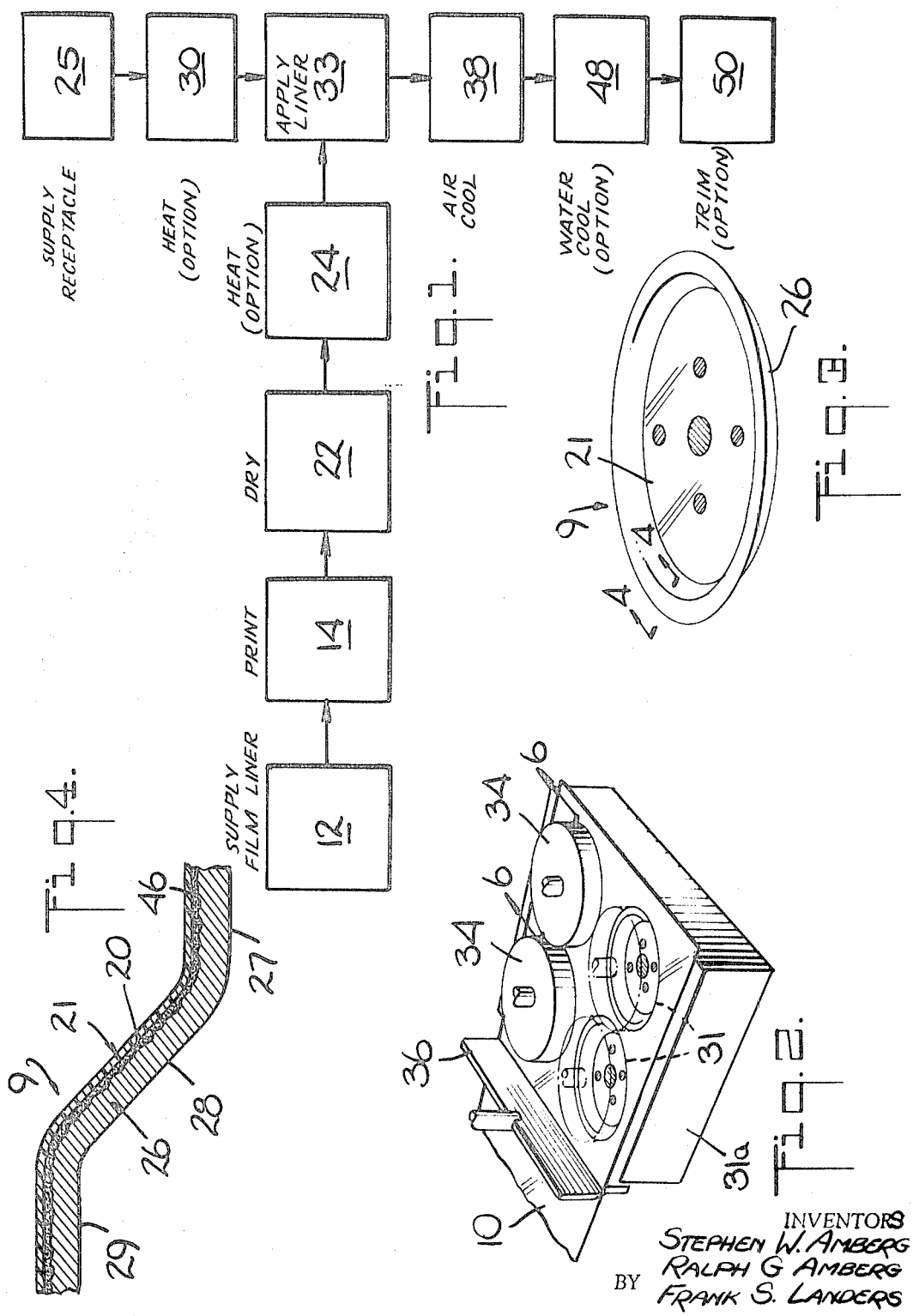

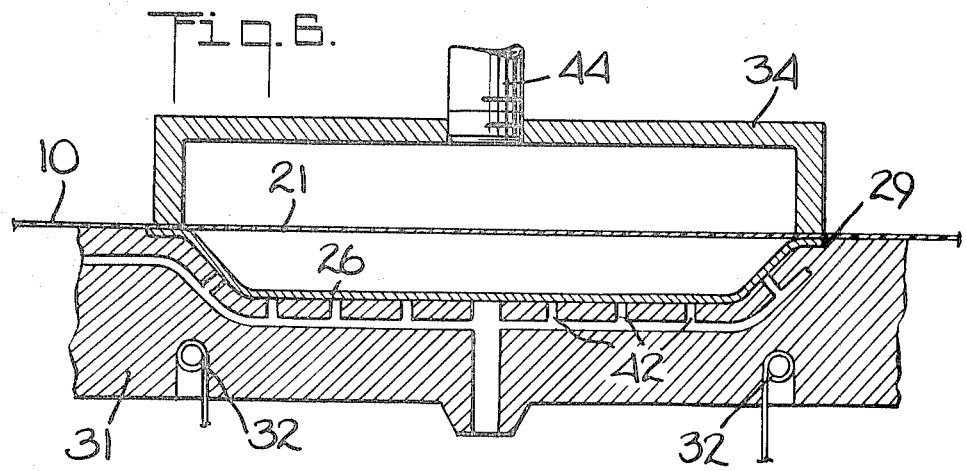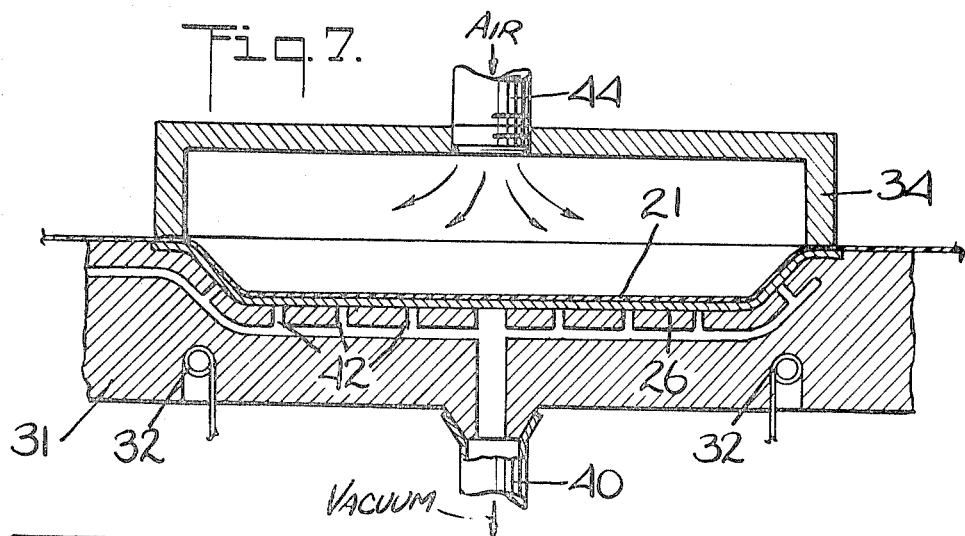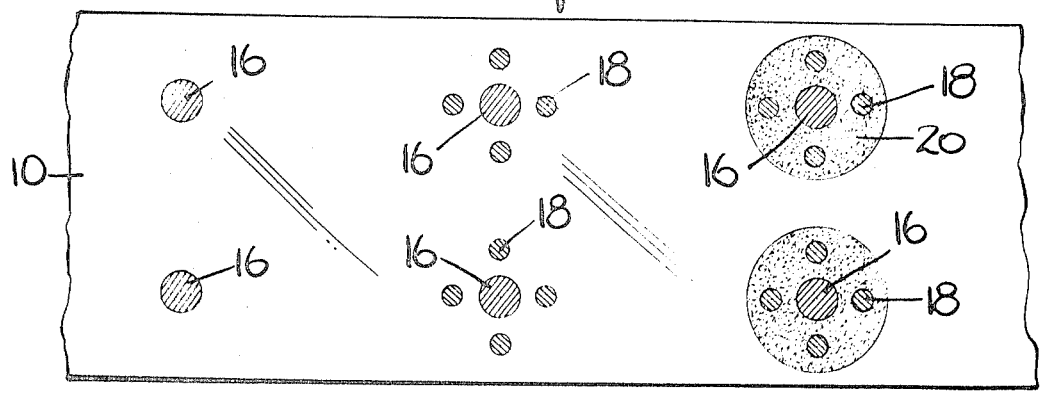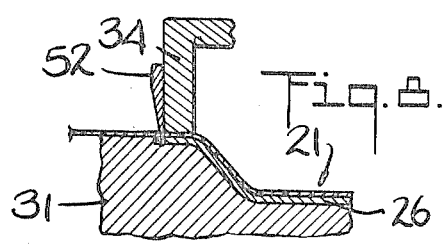

PLASTIC LINED RECEPTACLE OR THE LIKE

This application is a continuation of our copending application Ser. No. 445,927, filed Apr. 6, 1965, now abandoned.

This invention relates to plastic lined receptacles, and more particularly to techniques for applying the liner material to the base receptacle. The invention may also be considered as relating to techniques for applying decorative designs to receptacles, for reasons as will become apparent.

Although the invention may be used in connection with base receptacles made of different materials and having different shapes, it was made during the course of attempts to improve paper plates, particularly molded pulp throwaway plates as are conventionally used as party plates at home or at picnics or other places. Accordingly the invention will be described in connection with such use, although reference is hereby made to copending application Ser. No. 415,930, filed Dec. 4, 1964, as suggesting other receptacles and methods in connection with which the principles of the present invention may find application.

In order to improve the texture and hardness of its usable surface and to reduce its susceptibility to deterioration by moisture or greases from foodstuffs during use, it is desirable that a paper plate be coated or lined with a grease and water-impervious relatively tough or hard material, such as plastic material. However, in the past such liner materials have not been easily or economically applied, or applied in effective manner producing either a relatively hard-finish surface for resisting knife cuts or indentations or the like, or a firm bond between the base receptacle and the liner or coating material to prevent dislodgment of the liner under the contemplated conditions of use. Effective bonding is especially important where the plate may be severely exposed to liquids during use, or where it may be exposed to high temperature such as when warming foods placed thereon by placing the plate in an oven or the like for a period of time. Today there exists a need for a relatively inexpensive paper plate having a tough or hard-finish liner rendering it impervious to liquids and greases, and capable of being placed in an oven at relatively high temperature without danger that the liner will melt or peel off.

Further, there exists a need for a paper plate which is attractively and colorfully decorated in an effective manner to increase its visual appeal at parties, picnics and the like where it may be used. Although the past paper plates have been colorfully printed using printing inks, the ink either tends to wear off, or imparts the impression that it will either dissolve or wear off during use of the plate, thus actually detracting from the decorative appeal which the plate affords since the user may believe that the foodstuffs on the plate will be contaminated by the ink, whether or not it is the fact.

The present invention provides an improved plastic-lined receptacle, such as a paper plate, which has all of the foregoing characteristics as well as others as will become apparent. It is economically manufactured and adapted for mass production techniques using commercially available production machinery as will be seen. When formed, the lined paper receptacle is capable of retaining water at or near the boiling point for a substantial period, and capable of being placed in an oven at temperatures up to about 250° F. for a period of time, without danger that either the liner or the decoration will disintegrate or be removed.

In general, the invention contemplates the adhesive securement of a liner of plastic film material, which has a relatively high softening point temperature, to a fibrous base receptacle by means of an adhesive which is admixed with the ink which forms the decorative design to be disposed between the primary liner material and the base receptacle when the lined receptacle is fully formed, the adhesive material having a softening point temperature below that of the primary liner material. Thus, the so-conditioned printing ink which forms the printed decoration is employed to adhesively secure the liner to the base receptacle.

Briefly describing the invention in its preferred embodiment, a paper dinner plate, made of molded pulp material and having interior surfaces as provided by its bottom and a diagonally upturned peripheral edge as is conventional, is provided with both attractive decoration and a liner of polypropylene plastic material on these upwardly facing interior surfaces. The decoration which comprises multicolor printing initially disposed on the underside of the polypropylene liner material includes an overlying coating of printers' ink which contains polyamide resin material. This coating is preferably pigmented to form a part of the overall decoration and, whether or not it overlies other ink deposits which provide a multicolor design, serves as the bonding material with which the polypropylene sheet is adhesively secured to the surfaces of the paper plate or base receptacle.

In the preferred process for lining the paper plate, the undersurface of the polypropylene sheet, which is transparent material, is first printed, using any conventional printing ink and process, with one or more colors which provide all or part of the decorative design which will be viewable therethrough when the liner has been bonded to the base plate. For example, colorful floral designs or ring patterns conforming to the shape of the paper plate may serve as the referred to decoration which is initially printed on the underside of the primary liner material. As a last step in the printing process, a disc-shaped pattern of ink containing a quantity of polyamide resin material is printed by the usual printing process over all of the area of the liner material which will be bonded to the base plate, the pattern having diameter conforming to that of the base plate. Preferably, these decorative patterns are formed along a continuous length of the plastic sheet material for facilitating the substantially continuous process by which the liners are applied to the base receptacles in a production line technique. The printed patterns are dried using any conventional ink drying process, and the thus decorated liner material is delivered to the liner-applying stage of the operation.

Either at the time the molded pulp plates are formed, or subsequent thereto in a separate process, the liner material is applied to the individual paper plates by heating either the paper plate or the polyamide ink coating, or both, to a temperature whereat the polyamide resin is rendered tacky or molten but at which the primary polypropylene liner material remains unaffected, whereupon the coated surface of the liner material is brought into firm contact with the interior surfaces of the paper base plate. Upon cooling, the liner is found to be firmly bonded to the base receptacle, and it will be observed that the liner provides a hard, glossy finish revealing the attractive decorations thereunder. Of course, the liner application process includes a step of blanking out the liner material patterns, and other steps as will be described.

These and other objects, features, and advantages of the invention will be apparent from the following detailed description thereof when taken with reference to the accompanying drawings in which:

FIG. 1 is a schematic diagram showing of the steps in making a decorated plastic lined receptacle in accordance with the invention;

FIG. 2 is a somewhat diagrammatic perspective view of apparatus as may be used in one of the steps of the FIG. 1 showing, being that of applying the liner to the base receptacle;

FIG. 3 is an enlarged perspective view of a finished plate according to the present invention;

FIG. 4 is a greatly enlarged sectional view taken along the line indicated at 4—4 in FIG. 3;

FIG. 5 is an enlarged view of the sheet or film of plastic material illustrating the application of the decorative coatings thereto, and which is another of the steps of the FIG. 1 showing;

FIG. 6 is an enlarged vertical sectional view taken along the line indicated at 6—6 in FIG. 2, and showing the step of positioning the film across the open end of the base receptacle;

FIG. 7 is a vertical sectional view similar to FIG. 6, but showing the step of bonding the film to the surfaces of the fibrous base receptacle using fluid pressure; and FIG. 8 is a fragmentary vertical sectional view showing the step of trimming the excess material from the peripheral edge of the receptacle.

For purposes of explaining the invention, the detailed description is directed to its incorporation into a paper plate of so-called "dinner" size as shown in its completed form in FIG. 3, although the invention may be incorporated into receptacles having different size or shape. The plate, which is generally indicated by reference numeral 9, includes a base receptacle 26 of molded pulp construction and a plastic liner 21, firmly secured thereto throughout the area of its interior, or upwardly facing surfaces. As will be described, the interior surfaces of the completed plate are colored by a multicolored decoration of any desired design.

Referring to FIG. 1, there is diagrammatically illustrated a series of steps in the process of making the decorative plastic-lined plate. Generally, the steps 12, 14, 22 and 24 are those relating to the processing of the liner material, and steps 25 and 30 relate to the preliminary processing of the base receptacle before the liner material is applied to the base receptacle at step 33. The steps 38, 48 and 50 represent operations which occur subsequent to the liner applying step, and it will be noted that all of the steps in the process are performed in sequence as indicated by the arrowheads in FIG. 1.

Referring first to the preliminary processing of the liner material, a continuous sheet of the plastic liner material is drawn from a roll thereof as indicated by the step 12 process. Alternatively, the step 12 may represent a known type of continuous extrusion method of producing a continuous sheet of the plastic material which will be used as a liner in the completed plate 9. As generally indicated by FIG. 5, the continuous sheet of material has appropriate width for forming individual liners for two base receptacles placed side by side, although the sheet material may have width for forming only one, or perhaps more of such liners. The plastic liner material is generally indicated by reference numeral 10 in the drawings.

Although other sheet plastic material may be used, the plastic liner material 10 which is used in the preferred embodiment of the invention being described is transparent polypropylene film material having film thickness of from about 0.0005 inch to about 0.005 inch. In the embodiment being described, the film thickness is about 0.002 inch. Polypropylene was selected because of its relatively high softening point temperature as compared with that of the polyamide resin material which will be used to bond the polypropylene to the base receptacle, as will be described. Moreover, polypropylene may be readily conditioned in known manner for adherence thereto of usual types of printers' ink, and has other characteristics such as a relatively hard, glossy and smooth surface, and resistance to penetration or distortion by greases and liquids. For the purposes of this description, it will be assumed that the polypropylene sheet material, as it comes off the roll thereof at the step 12, has an underside surface which is already conditioned for receiving printers' ink in adhesive securement thereto.

Referring now to the step 14 which is illustrated by FIG. 5, a decorative design is printed on to the underside surface of the polypropylene sheet material 10. Any conventional printing process may be employed for applying the decorative coating which may include a multicolor arrangement as illustrated by FIG. 5. For example, FIG. 5 shows a sheet of plastic material 10 to which is applied a first design 16 of one color printing ink, a second design 18 of different color being printed in register with the first design 16 in a subsequent step which may or may not be preceded by a drying step for drying the ink of the first design 16, depending upon the printing process employed. In a third printing step of the principal process step 14, and as indicated by reference numeral 20 in FIG. 5, an overlying layer of polyamide ink, which may contain a white or other color pigment if desired, is printed on to the underside of the film 10 in superposed relation to the first and second designs 16, 18, the latter being then between the polyamide ink coating 20 and the underside surface of the film 10. The polyamide ink coating 20 has size and shape conforming to that of the upward projection of the upper surface of the base receptacle 26. The polyamide ink is prepared by adding to the conventional printers' ink a substantial quantity of polyamide resin in particle form and mixing the same thoroughly to uniformly distribute the resin throughout the ink mixture. The type of resin selected is that which has a softening point temperature on the order of about 180° F. or higher, but in any event somewhat below the softening point temperature of the plastic sheet liner material 10, for reasons as will be explained. In this connection, it will be noted that polypropylene sheet material, which was selected as the sheet material 10, has a softening point temperature range of about 275° F. to about 320° F. depending upon the process by which the polypropylene sheet is made. Thus, the resinous or other plastic material which is mixed with the printers' ink to be used in forming the coating 20 preferably has a softening point temperature of from about 180° F. to slightly below 275° F., i.e. about 250° F.

Following the printing step 14 of the process of preparing the liner material, the now printed film is dried at step 22 which step may include winding the printed film on a roll for temporary storage thereof until the same is to be applied to molded base receptacles 26.

Referring again to FIG. 1, reference numeral 25 indicates the molding step wherein the base receptacle 26 is formed by molding from a slurry of fibrous pulp material by any suitable conventional apparatus. Generally, such apparatus includes a molding die and a heated drying die whereby a relatively firm and rigid open top receptacle is made. When formed, and as illustrated in the enlarged showing of FIG. 4, the molded base receptacle is indicated generally by reference numeral 26, and includes a bottom portion 27, a diagonally upwardly extending sidewall portion 28 and a radially outward projecting mouth rim portion 29, the sidewall and bottom portions providing interior surfaces of the receptacle as will be understood.

Referring now to the steps employed in bonding the plastic liner material 10 to the base receptacle 26, the base receptacle 26 is either left within the mold within which it was formed or transferred to a liner-applying mold which conforms to the shape of the underside surface of the receptacle, either of these molds being somewhat diagrammatically illustrated by the holder or die 31 in FIGS. 6 and 7. The base receptacle 26 will either contain residual heat from the molding process by which it was made or will be preheated to a temperature about equal to the softening point temperature of the polyamide ink coating 20, such heating being indicated in FIG. 1 by the step 30. Where a separate holder or die 31 is used, the same is heated by heating elements therein, as generally indicated by reference numeral 32 in FIGS. 6 and 7. However, it should be noted that, although such preliminary heating of the base receptacle 26 is preferred, the application of a liner thereto in accordance with the present invention has been successfully carried out where the base receptacle was not preliminarily heated.

Similarly, and referring to step 24 in FIG. 1, the polyamide ink coating 20 on the film 10 is preheated, as by passing the film over a heated roller, the preheating being to a temperature above that at which the polyamide resin within the coating 20 is rendered tacky or molten. Such preliminary heating is conducted by passing the film, coated side down, across a rotatable hot roller arrangement whereby the disc-shaped pattern of the coating 20 is not blurred, and is the step occurring immediately prior to the positioning of the heated film, coated side down, on and across the peripheral mouth rim 29 of the base receptacle 26, as indicated in FIG. 6. However, it should be here noted that the coated film 10 need not be preheated, and the step 24 may be eliminated, where the molded base receptacle 26 is preliminarily heated in the step 30 to a temperature above the softening point temperature of the polyamide ink coating 20 on the film. That is, either the film or the base receptacle may be preheated, or both of them may be preheated, the latter being preferable.

The liner film is applied to the base receptacle in the step designated 33 in FIG. 1, and which is illustrated in detail in FIGS. 2, 6 and 7. As shown in FIG. 2, the base receptacle holder or die 31 may be one of four such dies contained in a quadruple mold which is generally indicated by numeral 31a, thus providing two rows, of two receptacles each, to which individual liners 21 will be applied. As best seen in FIGS. 2 and 6, in the step 33, a length of the film 10 is drawn over the unit 31a to a position whereat four of the coating pattern 20 are respectively disposed in alignment with the peripheral mouth rim portion 29 of the base receptacles. An annular clamp ring 34 is disposed above and in alignment with each of the dies 31, all of the clamp rings 34 being mounted for simultaneous vertical movement from a position in spaced relation above the respective dies 31 (not illustrated) to respective positions in clamping engagement with the respective peripheral mouth rim portions 29 of the base receptacles, as indicated in FIG. 2 and 6.

Referring briefly to FIG. 8, it will be understood that a peripherally extending and downwardly projecting knife 52 may be attached to each clamp ring 34 for blanking out the individual liners 21 from the continuous film material 10 commensurate with the movement of the clamp ring 34 to their clamping position as shown in FIG. 6. Alternatively, and as indicated in FIG. 2, the film material from which the four separate liners 21 are formed may be severed from the elongated film web by means of a vertically actuated knife 36. However, where such alternative is used, it will be appreciated that a subsequent film trimming operation will be necessary to separate the lined receptacles either after or commensurate with the forming thereof.

Referring again to FIG. 6, it will be appreciated that during the positioning of the film 10 across each base receptacle 26, the die 31 continues to be heated by the heating coils 32.

The step of actually applying the liner to the base receptacle is shown in detail by FIG. 7. Referring to FIG. 7, it will be understood that the bottom die 31 has a bottom connection 40 leading to a vacuum source (not illustrated). The bottom of the die 31 is provided with a plurality of vacuum openings 42 which allow a vacuum to appear at the underside surface of the base receptacle 26. Because the base receptacle is made from porous material, the vacuum may be drawn therethrough, and in this manner a vacuum applied at the connection 40 draws the individual liner 21 down into firm, contiguous conforming relation with upwardly facing interior surfaces of the base receptacle 26. To assist in providing the firm engagement between the liner and the base receptacle during this stage of the operation, the clamp ring 34 is in the form of a top cover for the assembly and is provided with a centrally disposed air connection 44 through which air pressure may be directed on to the upper or outer surface of the film liner 21. As a specific example of the practice of the preferred embodiment of the invention, a vacuum of between about 3 inches and about 4 inches of mercury is applied through the connection 40 of the die 31, and air pressure of from about 40 to about 50 p.s.i. is applied to the upper surface of the liner 21 for the period of time required to establish the firm engagement, which is about 2 seconds. Although a combination of positive air pressure and vacuum pressure as described is preferred, either one or the other may be used alone for the purpose of providing firm engagement at the now heated interface between the liner 21 and base receptacle 26.

Further, it should be particularly noted that the temperature to which the film liner 21 or the base receptacle 26, or both, is heated during the liner applying step 33 is such that the polypropylene primary liner material 10 is not rendered tacky or softened in any manner. That is, the temperature is above that at which the plastic or resinous material contained in the ink coating 20 is rendered molten, but below that at which the basic liner material 10 is rendered molten. In this connection, it should be noted that the periphery of the clamp ring 34, which engages the plate peripheral portion 29 and the overlying peripheral portion of the liner film 21 to press the same firmly together, should be heated to the same temperature (by means not shown) so that the film is firmly bonded to the periphery of the plate. The material 10 in the individual liner 21 thus retains its hard, smooth, glossy finish, and its transparent nature, throughout the bonding step. Because of the transparent nature of the film 10, it will further be noted that the colors of the designs 16 and 18, and the color of the polyamide ink coating 20 show clearly therethrough and present the desired attractive appearance at the upper surface of the completed plate 9. Considering the relative softening point temperatures of polyamide ink and other plastic sheet materials, it should also be noted that other plastic film materials having the required surface characteristics and stretchability, such as polyolafins (polypropylene, polyethylene, etc.), may be used as the primary liner material 10. In particular, low density (9.2) polyethylene having a softening point temperature of as low as about 200° F. has been satisfactorily employed.

As illustrated by reference numeral 46 in the detailed showing of FIG. 4, the interior surfaces of the base receptacle 26 are more often stippled or otherwise rough and irregular due to the inherent nature of the pulp molding process. In such case, it is believed that the heated coating material 20 melts and flows down into interstices between the fibers of the base receptacle 26 and, upon cooling, grips the fibers and becomes firmly bonded thereto. Alternatively, and probably depending upon how close to the softening point temperature of the coating 20 the liner 21 is heated, the liner 21 and its coating 20 may span across these interstices and be firmly bonded only to the high points of the stippled pattern. In any event, and whether or not the surface of the base receptacle is stippled or roughened, it will be found that, after cooling, the liner 21 is extremely smooth and hard at its upper or usable surface after the plate 9 has been formed in the manner described.

Referring again to FIG. 1, reference numerals 38 and 48 indicate cooling steps one or both of which may be used to quickly cool the now fully lined plate 9 to a temperature below the softening point temperature of the plastic or resinous material contained in the coating 20, and thus the bond between the liner 21 and the base receptacle 26 is made permanent. Although not illustrated, step 38 indicates the opening of the mold by lifting the clamp ring 34 out of engagement with the peripheral rim portion 29 of the plate 9. During this operation, the vacuum on the underside of the plate is continued so as to assure that the still hot liner 21 maintains its firm engagement with the base receptacle. The air pressure through the sealing ring 34 is also maintained for a brief period when the mold is opened and while the ring 34 is still in close proximity to the plate 9, whereupon the blow of air serves to somewhat cool the liner 21, drawing in air at room temperature. Such blow of air may be sufficient to adequately cool the plate. However, if desired, the plate may be further cooled, or completely cooled, by a stream of cold water poured into the plate, as indicated by step 48 but not illustrated in detail.

Also referring to FIG. 1, and depending upon whether or not a subsequent trimming of the liner material is required, the plate forming process may include a liner trimming step 50. Although not illustrated, such trimming step may also include a trimming of the peripheral mouth rim portion 29 of the base receptacle 26 to reduce its size as may be desired. The trimming step is analogous to that shown in FIG. 8 insofar as a ring-shaped vertically actuated blade 52 is directed downwardly to trim the excess film and base material from the periphery of the plate 9.

With regard to the inklike coating 20 which serves as the heat sensitive adhesive bonding material, although polyamide adhesive inks have been found most satisfactory, it appears that other inks, such as a pigmented polyvinylacetate emulsion, might also be used, although in the case of polyvinylacetate emulsions some drying difficulties may be experienced. In any event the coating may be relatively thin such that, for example where polyamide ink is used, the ultimate thickness of the dried coating in the finished plate 9 is only about 0.0002 inch.

The softening point temperature differential between the coating 20 and the film 10 should be from about 20°-30° F. for practical reasons and, where polypropylene sheet material is used, this differential is preferably about 75° F., the liner 21 being applied to the base receptacle 26 at about 200° F. During the process, the hot rollers for preheating the film 10 at the preheating step 30 are maintained at 220° F.

Thus has been described a decorative plastic-lined receptacle and a method for making the same which achieves all of the objects of the invention.

What is claimed is:

1. The method of applying a plastic film liner in initially flat sheet form to the interior surfaces of an open topped receptacle having configuration providing a mouth rim at its open top and an interior sidewall surface extending generally downward from said mouth rim, said plastic film being a polyolefin film, comprising the steps of applying to one surface of said polyolefin plastic film liner sheet a dryable coating of a pigmented resin type heat sensitive adhesive material in liquid form, said coating being nontacky when dry and said heat sensitive adhesive material having a softening point temperature which is lower than the softening point temperature of said plastic film, drying said coating, positioning said coated sheet on and spanning across said receptacle mouth rim, said coated surface of said sheet facing down, stretching and pressing said sheet into contiguous conforming relation with said receptacle surfaces while holding said sheet against said receptacle mouth rim and while applying heat to said coating at a temperature at least equal to the softening point temperature of said heat sensitive adhesive material but below the softening point temperature of said plastic film and while maintaining said plastic film at a temperature below its softening point temperature, and subsequently cooling said coating to a temperature below said softening point temperature of the heat sensitive adhesive material, whereby said coating adhesively secures said plastic film liner sheet to said receptacle surfaces and substantially all of the characteristics of said polyolefin film are retained.

2. The method according to claim 1 wherein said heat sensitive adhesive material comprises polyamide resin.

3. The method according to claim 1 wherein said heat sensitive adhesive material comprises polyvinylacetate.

4. The method of lining the interior surfaces of a molded paper plate with a liner of initially flat, transparent plastic film material having a softening point temperature higher than substantially 200° F., said plate having a mouth rim, a bottom, and a peripheral sidewall portion extending between its said mouth rim and bottom, comprising the steps of printing ink decoration on one surface of said plastic film material, said ink decoration comprising an exposed layer of polyamide ink extending throughout an area conforming to the upwardly projected size and configuration of said plate, said polyamide having a softening point temperature higher than substantially 180° F., but lower than said softening point temperature of said plastic film material, heating at least said interior surfaces of said plate to a temperature at least equal to said softening point temperature of said polyamide ink but below said softening point temperature of the plastic film material, clamping said flat plastic film material against said plate mouth rim to span thereacross and whereby said ink decoration is in substantial registry with the upwardly projected configuration of the plate, said ink decoration surface of the film material facing down, and then drawing a vacuum through said plate bottom to stretch and press said plastic film material into contiguous conforming relation with said peripheral wall and bottom of the plate while maintaining the plate substantially at said temperature and while maintaining said plastic film material below its said softening point temperature, and subsequently cooling said plate whereby said polyamide ink firmly bonds said plastic film material to the interior surfaces of said plate.

5. The method according to claim 4 wherein, prior to said step of clamping said plastic film material against said plate mouth rim, said process further comprises the step of heating said layer of polyamide ink substantially to said softening point temperature of the polyamide.

6. The method according to claim 4, wherein said plastic film material is polypropylene.

7. The method of applying plastic film liner in initially flat sheet form to the interior surfaces of an open topped receptacle having configuration providing a mouth rim at its open top and an interior sidewall surface extending generally downward from said mouth rim, said receptacle being of paper material, and said plastic film liner sheet being a polyolefin film, comprising the steps of applying to one surface of said plastic film liner sheet a coating of a liquid comprising a polyamide ink, said coating being nontacky when dry and said polyamide ink when dry having a softening point temperature which is lower than the softening point temperature of said plastic film, drying said coating, positioning said coated sheet on and spanning across said receptacle mouth rim, said coated surface of said sheet facing down, stretching and pressing said sheet into contiguous conforming relation with said receptacle surfaces while holding said sheet against said receptacle mouth rim and while applying heat to said coating at a temperature at least equal to the softening point temperature of said dried polyamide ink but below the softening point temperature of said plastic film and while maintaining said plastic film at a temperature below its softening point temperature, and subsequently cooling said coating to a temperature below said softening point temperature of the polyamide ink, whereby said coating adhesively secures said plastic liner sheet to said receptacle surfaces 8. The method according to claim 7 wherein said receptacle is of molded pulp material, and said polyolefin is polypropylene.

9. The method of applying a plastic film liner in initially flat sheet form to the interior surfaces of an open topped receptacle having configuration providing a mouth rim at its open top and an interior sidewall surface extending generally downward from said mouth rim and a bottom, said receptacle being of molded pulp material, and said plastic film liner sheet being a polyolefin film, comprising the steps of applying to one surface of said plastic film liner sheet a coating of a pigmented resin emulsion comprising a polyvinylacetate, said coating being nontacky when dry and said resin emulsion when dry having a softening point temperature which is lower than the softening point temperature of said polyolefin film, drying said coating, positioning said coated sheet on and spanning across said receptacle mouth rim, said coated surface of said sheet facing down, drawing a vacuum through said receptacle bottom to stretch and press said sheet into contiguous conforming relation with said receptacle interior sidewall and bottom surfaces while holding said sheet against said receptacle mouth rim and while applying heat to said coating at a temperature at least equal to the softening point temperature of said dried resin emulsion but below the softening point temperature of said plastic film and while maintaining said plastic film at a temperature below its said softening point temperature, and subsequently cooling said coating to a temperature below said softening point temperature of said resin emulsion, whereby said coating adhesively secures said plastic film liner sheet to said receptacle surfaces.

10. The method according to claim 9 wherein said polyolefin is polypropylene.

11. The method of lining the interior surfaces of an open topped paper receptacle with a liner of initially flat plastic film material, said plastic film material being transparent polypropylene, and said receptacle having configuration providing a mouth rim at its open top and at least an interior sidewall surface extending generally downward from said mouth rim, comprising the steps of applying a dryable pigmented resin emulsion coating to one surface of said plastic film material and permitting said coating to dry thereby forming a coated sheet, the resin in said coating having a softening point temperature which is lower than that of said plastic film material, positioning said coated sheet on and spanning across said receptacle mouth rim, said coated surface thereof facing down, holding said sheet against said receptacle mouth rim, applying fluid pressure to said sheet to stretch and press the same into contiguous conforming relation with all of the surfaces of said receptacle below its said mouth rim while applying heat to said coating at a temperature which is higher than said softening point temperature of said resin but below said softening point temperature of said plastic film material and while maintaining said plastic film material below its softening point temperature, and then cooling said coating to a temperature below said softening point temperature of the resin, whereby said coating bonds said plastic film material to said receptacle surface.

12. A plastic-lined dinner plate or the like comprising a base receptacle of molded pulp material having interior surfaces, an unseamed liner of transparent polypropylene film material in contiguous conforming relation with said base receptacle surfaces, said liner having a decorative printed pattern on the underside thereof, and resin material comprising polyamide ink disposed between and firmly bonding said liner to said base receptacle surfaces, said resin material being disposed on said liner beneath said printed pattern and extending throughout the area of interface between said liner and said surfaces, whereby said resin material is visible through said liner.

13. A plastic-lined dinner plate or the like comprising a base receptacle of molded pulp material having interior surfaces, an unseamed liner of transparent polypropylene film material in contiguous conforming relation with said base receptacle surfaces, said liner having a decorative printed pattern on the underside thereof, and resin material comprising polyvinylacetate disposed between and firmly bonding said liner to said base receptacle surfaces, said resin material being disposed on said liner beneath said printed pattern and extending throughout the area of interface between said liner and said surfaces, whereby said resin material is visible through said liner.

\* \* \* \* \*